United States Patent [19]

Boytor et al.

[11] Patent Number: 4,697,231

[45] Date of Patent: Sep. 29, 1987

[54] MACHINE CONTROL SYSTEM

[75] Inventors: Samuel G. Boytor, Elgin; Jeffry W. Jurs, Bloomingdale, both of Ill.

[73] Assignee: F. J. Littell Machine Company, Chicago, Ill.

[21] Appl. No.: 747,661

[22] Filed: Jun. 21, 1985

[51] Int. Cl.⁴ .................................................. G06F 15/46
[52] U.S. Cl. .................................... 364/188; 340/712; 340/715; 364/146; 364/189
[58] Field of Search ................ 364/188, 189, 140–147, 364/171; 340/711, 712, 715; 353/26 R, 26 A, 27 R, 27 A, 39, 25

[56] References Cited

U.S. PATENT DOCUMENTS

| | | | |
|---|---|---|---|
| 4,087,166 | 5/1978 | Rothbart et al. | 353/26 A |
| 4,174,891 | 11/1979 | Flint et al. | 353/26 A |
| 4,303,973 | 12/1981 | Williamson, Jr. et al. | 364/189 |
| 4,379,292 | 4/1983 | Minato et al. | 340/703 X |
| 4,448,503 | 5/1984 | Axelrod et al. | 353/26 A |
| 4,452,518 | 6/1984 | Di Gianfilippo et al. | 353/25 |
| 4,514,641 | 4/1985 | Tanaka et al. | 353/26 A X |
| 4,568,161 | 2/1986 | Di Gianfilippo et al. | 353/25 |

Primary Examiner—Joseph Ruggiero
Attorney, Agent, or Firm—Willian Brinks Olds Hofer Gilson & Lione Ltd.

[57] ABSTRACT

A machine control system includes a CRT on which a five bit screen image code is displayed, indicative of the particular screen image being displayed. Five sensors are mounted such that each senses a respective one of the code regions of the screen image code and generates a respective sensor signal. A controller compares the sensor signals with the screen image code for a commanded one of the screen images and indicates any disparity therebetween. In this way, a positive check is provided that the display screen actually displays the intended one of the image screens, and that the screen is in fact functional. In addition, a plurality of pushbuttons are provided which operate in two separate modes. In the first mode the pushbuttons provide programming inputs to the controller and in the second mode the pushbuttons act to control the machine directly via an alternate device, bypassing the controller.

14 Claims, 9 Drawing Figures

MACHINE CONTROL SYSTEM

BACKGROUND OF THE INVENTION

The present invention relates to improvements to machine control systems of the type which include a display screen and means for displaying a plurality of separate screen images on the screen.

Such machine control systems are used to control a wide variety of machines, such as for example sheet metal presses for press forming products such as sheet metal housings and automotive body components. Such presses and their component dies represent a major capital investment. Damage to either the press or the die can result in unacceptably long downtime. In addition, there is the possibility that an improperly controlled machine may injure operators or other personnel.

For all of these reasons, it is critically important that the machine control system operate as desired, and that undesired movements of the machine or movements that could result from an improper or incomplete screen being displayed be eliminated. The present invention is directed to improvements to such machine control systems which improve the reliability of the system and which can be used to place the controlled machine, if desired, under direct manual control of the operator.

SUMMARY OF THE INVENTION

According to a first feature of this invention, a machine control system of the type described above is provided with means for generating a plurality of screen image codes, each comprising a plurality of code regions, and each included in a respective one of the screen images such that the screen image and the respective screen image code are displayed on the display screen simultaneously. A plurality of sensors are positioned such that each senses a respective one of the code regions and generates a respective sensor signal indicative of the sensed code region. Finally, means are provided for comparing the sensor signals with the screen image code for a displayed one of the screen images and for indicating any disparity.

The generating means, the sensors, and the comparing means cooperate to provide a positive check that the intended ones of the screen images are in fact displayed on the display screen. In this way, potential problems possibly arising from display screen failures are substantially eliminated. By positively checking that the displayed image screen on the display screen is the intended image screen, failures such as a failure of the display screen or a failure to display an intended one of the image screens or degeneration of integrity of the screens are prevented from resulting in operation of the machine.

According to a second feature of this invention, the machine control system is provided with an array of switches mounted on a front panel in physical alignment with respective label regions of the screen images. A mode control switch is provided having a set of common poles, each connected with a respective one of the switches. The mode control switch also includes a set of first output lines and a set of second output lines. The mode control switch operates to interconnect each of the switches with a respective one of the first output lines when in a first state and to interconnect each of the switches with a respective one of the second output lines when in a second state. Means are provided for connecting the first output lines to the controller such that the switches provide respective input signals to the controller when the mode control switch is in the first state. Finally, means are provided for connecting the second output lines to the machine controlled by the machine control system such that the switches provide respective control signals for the machine when the mode control switch is in the second state, thereby bypassing the machine control system. Preferably, means are also provided for disabling control of the machine by the control system when the mode control switch is in the second state.

This second feature of the invention allows the array of switches to be used in two separate modes. In the first mode, the switches are used to supply input signals to the controller, as for example when an operator is programming the machine control system. In the second mode, the switches can be used by the operator to control the machine independently of proper operation of the machine control system, either by controlling the machine directly or by using a totally redundant backup control system. By simply switching the mode control switch from the first state to the second state, the mode of operation of the array of switches can be changed quickly, simply and reliably. Thus, in the event an operator detects a malfunction of the machine control system, he can intervene directly. In addition, the screen sensing system described above can be used to change the mode of operation of the switches in the event the screen sensors detect a screen failure. This is all made possible without duplication of switches.

The invention itself, together with further objects and attendant advantages, will best be understood by reference to the following detailed description, taken in conjunction with the accompanying drawings.

DETAILED DESCRIPTION OF THE PRESENTLY PREFERRED EMBODIMENTS

Figure 1:
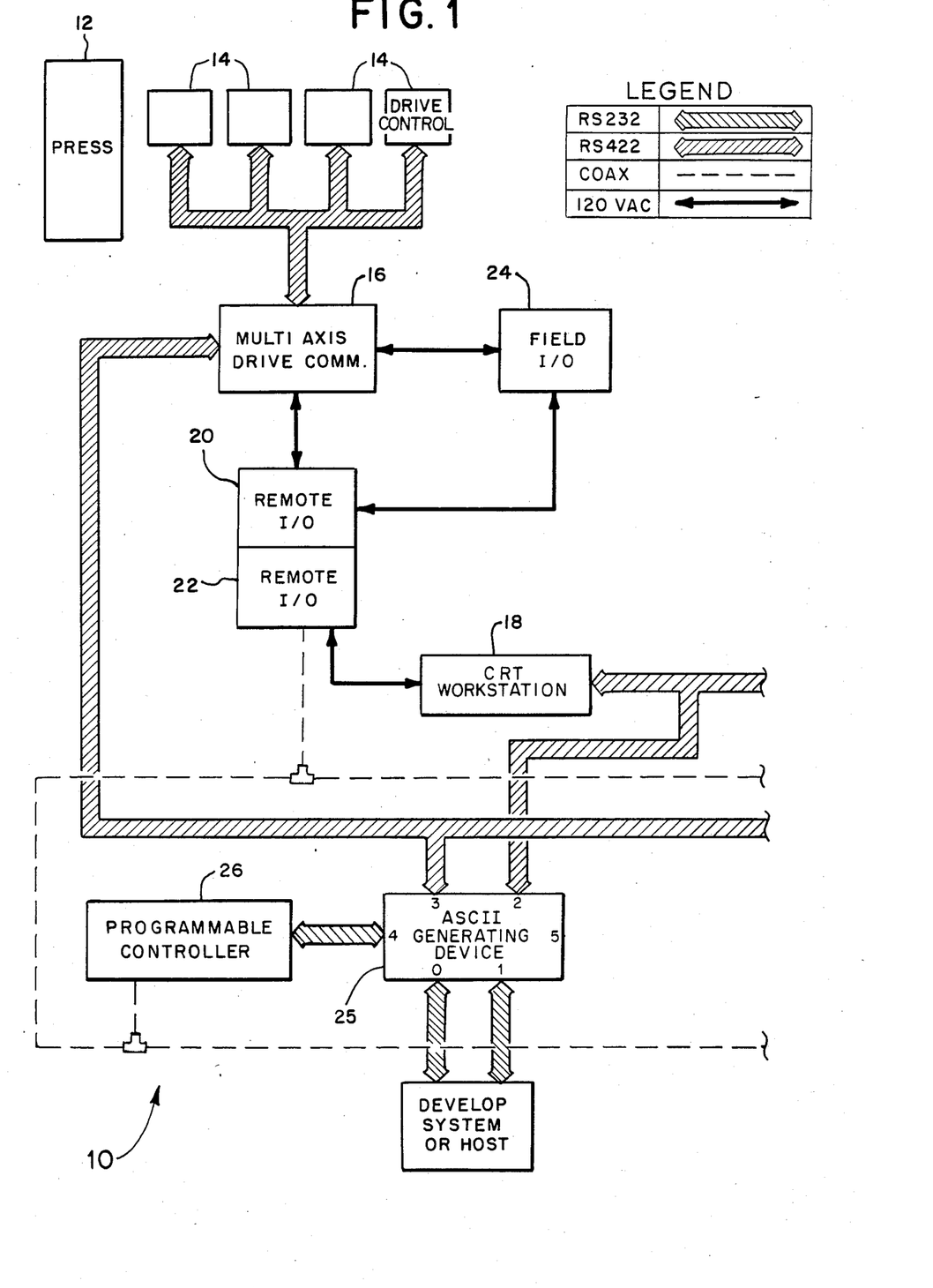
FIG. 1 is a schematic drawing of a machine control system which incorporates a presently preferred embodiment of this invention.

Turning now to the drawings, FIG. 1 shows a schematic representation of a machine control system 10 which includes a presently preferred embodiment of this invention. This control system 10 is shown connected to a machine such as a press 12. In this example, the press 12 includes five separate multi axis drive controls 14, each of which is controlled by the control system 10. In most applications a single control system is used to control a plurality of machines. However, only a single press 12 has been shown in order to simplify the drawing.

The control system 10 includes a programmable controller 26 which is coupled to a CRT controller 25 (which includes an ASCII generating device) and a work station 18. The work station 18 can be used to program the operation of the controller 26 and to monitor operation of the press 12. The controllers 25, 26 communicate directly with a multi-axis drive communication unit 16, which is in turn connected to each of the drive controls 14. The work station 18 is connected both with the CRT controller 25, and with the multi-axis drive communication unit 16 via the remote I/O units 20, 22 and the field I/O unit 24. The workstation 18 includes a CRT 52 which displays images generated by the CRT controller 25 under direction of the programmable controller 26.

The general operation of the controllers 25, 26 does not form part of this invention and is not therefore described in greater detail. FIG. 1 has been provided merely to illustrate a suitable application for the present invention. By way of example, in the system 10 the controller 26 is a programmable controller such as a Gould model 584L, and the CRT controller is an industrial computer such as a Gould Model IMC4400.

Figure 2:
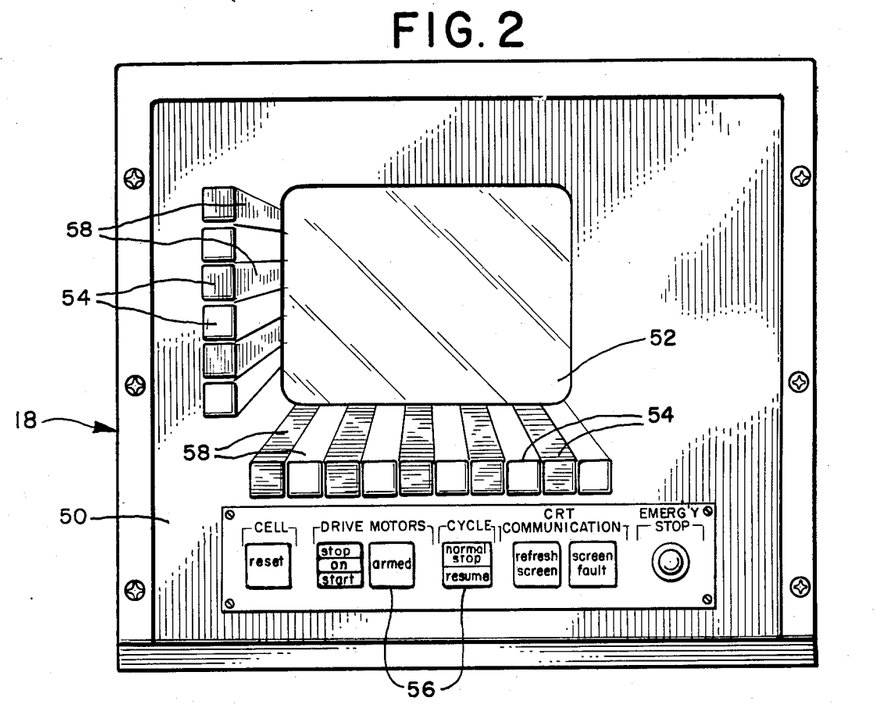
FIG. 2 is a front view of a work station included in the system of FIG. 1.

FIG. 2 shows a front view of a front panel 50 included in the work station 18. This front panel 50 includes a CRT 52 and an array of 16 pushbuttons 54. Each of the pushbuttons 54 is manually operated and is associated with a respective portion of the screen of the CRT 52 by means of rays 58 on the front panel 50. In addition, a number of auxiliary switches 56 are mounted to the front panel 50 beneath the pushbuttons 54.

In this embodiment, the CRT 52 is used to display a number of different screen images under the control of the controllers 25,26. Some screen images provide only status information or text to the operator. Other screen images define functions for the pushbuttons 54 to provide the operator with direct control over operations of the press 12. Yet other screens are used to define the functions of pushbuttons 54 for use in programming the controllers 25,26. In particular, whenever the front panel 50 is being used to control machine functions (either directly or via the controller 26) it is critically important that the labels on the CRT 52 for the respective pushbuttons 54 corresponds to the labels commanded by the controller 26. Otherwise, an operator could inadvertently control the press 12 with the pushbuttons 54 in a suitation where the CRT 52 erroneously indicated the functions for the pushbuttons 54.

Figure 4:
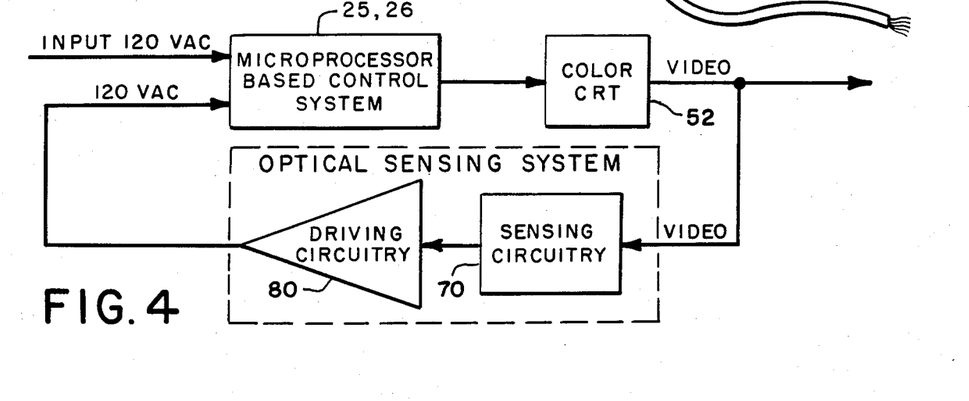
FIG. 4 is a schematic diagram of an optical sensing system included in the control system of FIG. 1.

FIG. 4 shows a block diagram of the presently preferred embodiment of the screen sensing system of this invention. This screen sensing system cooperates with the controllers 25, 26 and the CRT 52 and includes a sensing circuit 70 and a driving circuit 80. The controller 26 in cooperation with the CRT controller 25 generates a screen specific screen code on each of the screen images displayed on the CRT 52. The sensing circuit 70 senses the code displayed by the CRT 52, and supplies inputs indicative of the sensed code to the driving circuit 80. The driving circuit 80 switches 120 VAC signals in correspondence with the sensed code, and these signals are applied as inputs to the controllers 25,26. The controllers 25, 26 then compare the intended code with the sensed code to insure that the displayed screen on the CRT 52 is in fact the intended screen.

Figure 3:
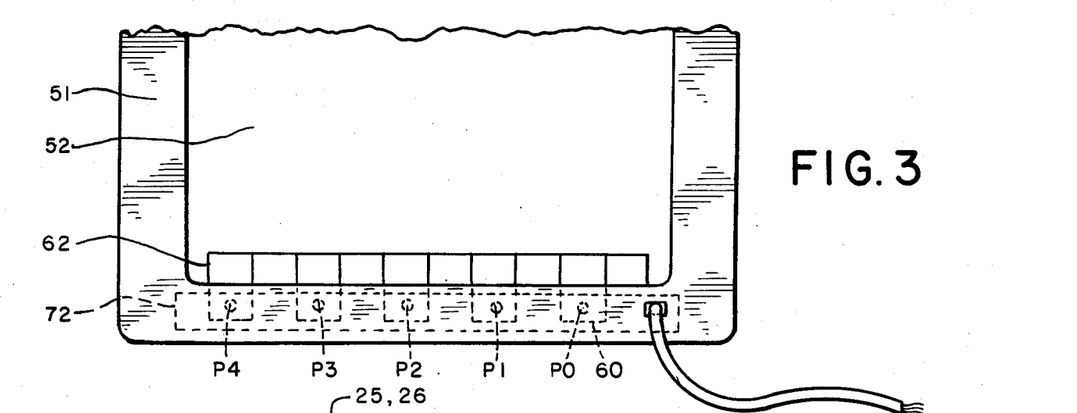
FIG. 3 is an enlarged schematic representation of portions of the work station of FIG. 2.

FIG. 3 shows a lower portion of the CRT 52, along with the two lowermost lines of the screen image. The next to the bottom line of the screen image is a row of ten menu fields 62 which alternate in color between yellow and white in this embodiment. Each of these menu-fields 62 is aligned with a respective one of the rays 58 and is used to clarify the correspondence between portions of the screen image and respective ones of the pushbuttons 54.

Figure 5:
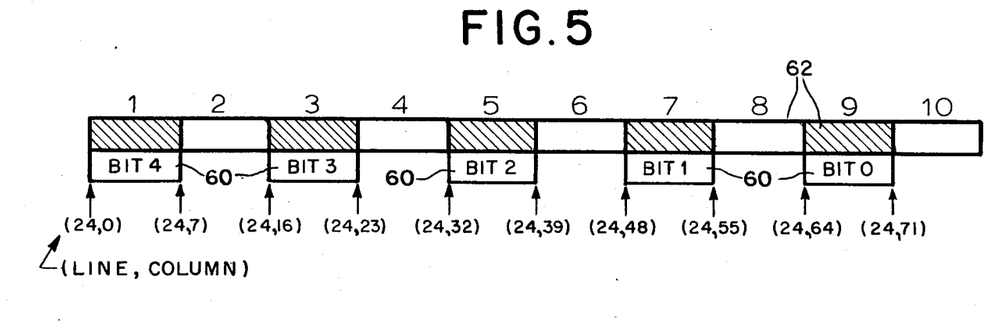
FIG. 5 is a schematic representation showing the layout of a lower portion of a screen image displayed at the work station of FIG. 2.

The bottom line of the image is used to display the screen image code, and it includes five separate code fields 60. The controller 25 displays a screen specific screen code by causing selected ones of these code fields 60 to be illuminated. In this example, a maximum of 32 separate screen images are used, and a simple binary code between 0 and 31 is encoded in the lowermost line of each of the screen images. For example, in screen image 0 of this embodiment each of the code fields 60 is darkened. Screen image 1 has the four left-hand code fields darkened and the right-hand code field 60 illuminated. Screen image 4 has the center code field 60 illuminated and the remaining code fields darkened. FIG. 5 shows a schematic representation of the final two lines of one of the screen images. As discussed above, the next to the last line alternates between a white field and a yellow field. The five code fields 60 are labeled Bit Zero through Bit Four in FIG. 5. The numbers in parenthesis in FIG. 5 indicate the line and column of the edges of each of the code fields 60.

Figure 6:
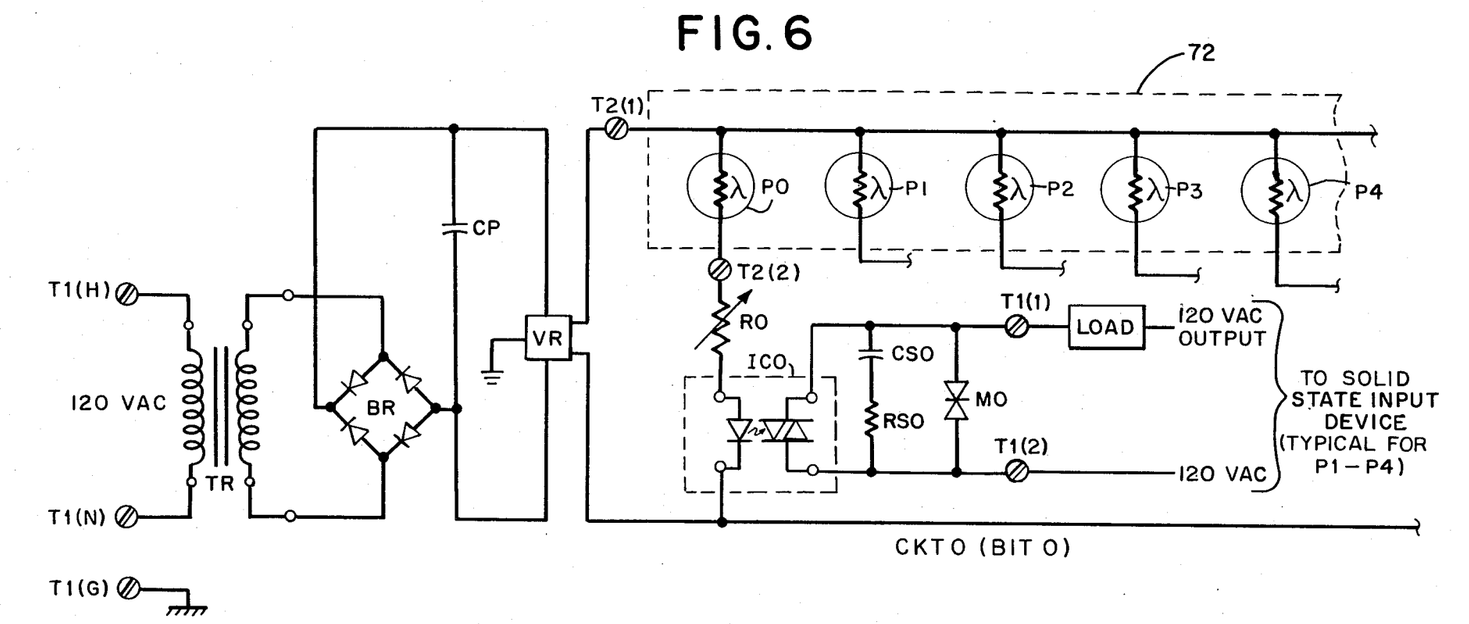
FIG. 6 is an electrical schematic diagram of portions of the optical sensing system of FIG. 4.

As shown in FIGS. 3 and 6, the sensing circuit 70 includes five individual photosensors which in this embodiment are photo-resistors P0-P4. The five photo-resistors P0-P4 are mounted to a circuit board 72 which is mounted to the back side of a CRT shroud 51 such that each of the photo-resistors P0-P4 is positioned to sense the brightness of a respective one of the code fields 60. Each of the photo-resistors P0-P4 includes a photosensitive material having a total electrical resistance inversely proportional to the brightness of the associated one of the code fields 60. In this embodiment, each of the photo-resistors P0-P4 is used as a current limiting device in current sensing circuitry. Low current through one of the photo-resistors P0-P4 is interpreted as an off condition and maximum current through the photo-resistor is interpreted as an on condition of the respective code bit.

As shown in FIG. 6, each of the photo-resistors P0-P4 limits current flow through a respective adjustable resistor R0-R4 and a respective LED included in an optically isolated triac driver IC0-IC4. Each of these triac drivers IC0-IC4 includes a light emitting diode, the brightness of which is inversely proportional to the instantaneous resistance of the respective photoresistor P0-P4. The adjustable resistors R0-R4 are used to calibrate each of the photo-resistors P0-P4.

In addition, each of the optically isolated triac drivers IC0-IC4 includes a triac designed to control loads on a 120 VAC power line. The optically isolated triac drivers IC0-IC4 allow a relatively low power sensing signal to drive a high power load with a small number of components. In addition, they provide practically complete isolation of the driving circuitry from the power line.

To prevent transient voltage disturbances on the AC line from exceeding the static dv/dt rating of the triac drivers IC0-IC4, a varistor M0-M4 is supplied in each circuit. In addition, to reduce the rate of voltage rise seen by the driving circuitry, a snubber network is also provided including capacitors CS0–CS4 and resistors RS0–RS4. Table 1 provides illustrative examples of suitable component specifications for use in the sensing circuit 70 and the driving circuit 80.

TABLE 1

| SYMBOL | DESCRIPTION |
| --- | --- |
| TR | TRANSFORMER |
| | TRIAD TYPE F-138P 25.2VCT @ .06A |
| BR | FULL-WAVE BRIDGE RECTIFIER |
| | MOTOROLA NO. MDA920A4 |
| CP | ELECTROLYTIC CAPACITOR |
| | SPRAGUE NO. TE1207 25MF 2500VDC |
| VR | VOLTAGE REGULATOR |
| | MOTOROLA NO. MC7818AC + 18V |
| P0–P4 | PHOTORESISTOR |
| | VACTEC VT-741 |
| R0–R4 | POTENTIOMETER |
| | SPECTROL TYPE 64W 10KOHM 25 TURN |
| IC0–IC4 | OPTO-ISOLATOR/DRIVER |
| | MOTOROLA NO. MOC3011 |
| CS0–CS4 | CERAMIC CAPACITOR |
| | CENTRALAB NO. DD-503 .05MF 500VDC |
| M0–M4 | METAL OXIDE VARISTOR |
| | GENERAL ELECTRIC NO. V270MA2A |
| RS0–RS4 | RESISTOR |
| | ALLEN-BRADLEY NO. EB4705 |
| | 470HM .5WATT 5% |
| T1 | TERMINAL STRIP |
| | AUGAT TYPE 5MV-06 |
| T2 | TERMINAL STRIP |
| | AUGAT TYPE 5MV-13 |

Figure 7:
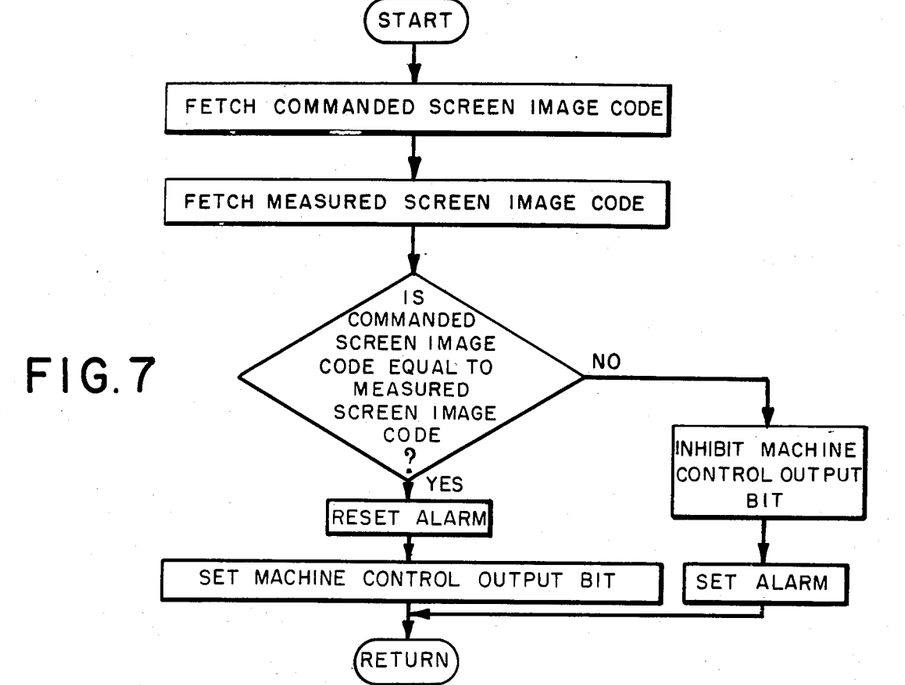
FIG. 7 is a flow chart of a program included in the optical sensing system of FIG. 4.

FIG. 7 is a flow chart of a program executed by one of the controllers 25,26. As explained above, each of the 32 separate screen images includes a respective binary screen image code between 0 and 31. Thus, when the controller 26 commands any one of the 32 possible screen images, the corresponding screen image code is automatically displayed on the CRT 52. The sensing circuit 70 and the driving circuit 80 generate a 5 bit signal which is applied as an input to the controller and which defines the measured screen image code.

In the program of FIG. 7, first the commanded screen image code associated with the desired screen image is fetched, along with the instantaneously occurring measured screen image code from the driving circuit 70. The commanded screen image code is then compared with the measured screen image code. If the two codes are equal, the controller 26 then sets a machine control output bit. In the event the two image codes are not equal, indicating that the commanded screen image has not been displayed properly, then the machine control output bit is inhibited, and an alarm signal is generated.

The controller 26 is responsive to the state of the machine control output bit. The state of the machine control output bit is monitored to insure that the controller 26 is prevented from driving any of the drive controls 14 unless the machine control output bit is set. Thus, the controller 26 responds to any disparity between the commanded and measured screen image codes by disabling its control over the press 12. In this way, mislabeled pushbuttons 54 are prevented from having an adverse effect on the operation of the press 12.

Figure 8:
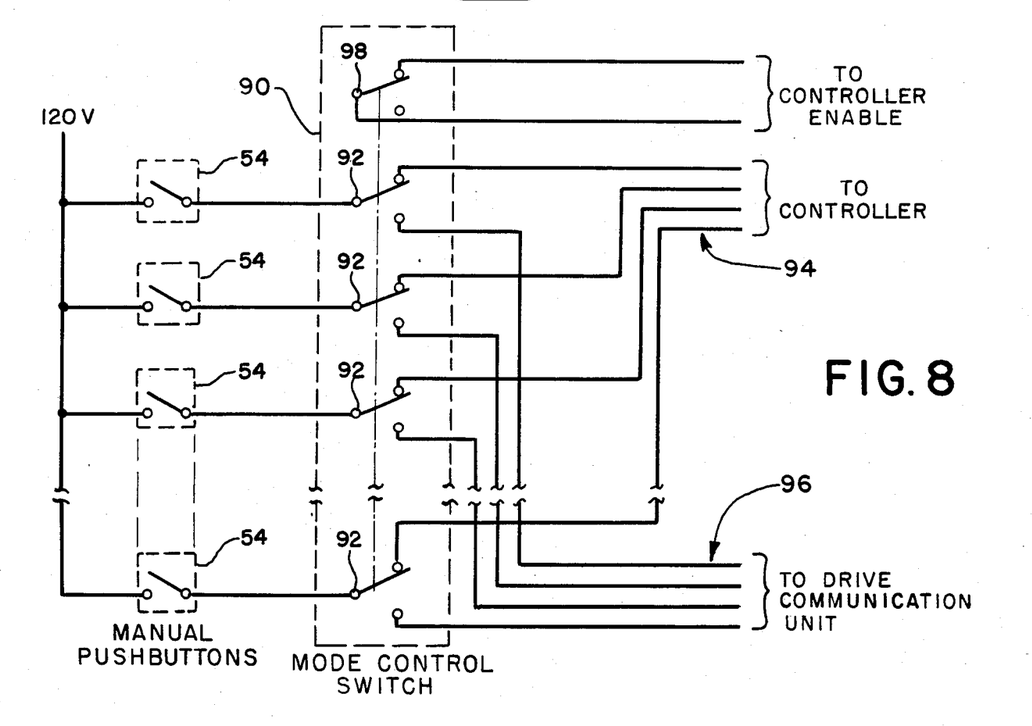
FIG. 8 is an electrical schematic diagram of a portion of the control system of FIG. 1.

FIG. 8 is a schematic diagram which illustrates a second safety feature of the machine control system 10. As shown in FIG. 8 each of the pushbuttons 54 operates to switch a 120 VAC signal. A mode control switch 90 is provided which includes an array of parallel switches, each of which includes a common pole 92 connected to a respective one of the pushbuttons 54. In addition, first and second output lines 94, 96 from each of the individual switches are included in the mode control switch 90. The first output lines 94 are coupled to the controller 26 and the second output lines 96 are connected to the multi-axis drive communication unit 16 directly, bypassing the controller 26. Thus, when the mode control switch 90 is in a first state as shown in FIG. 8, each of the pushbuttons 54 supplies programming inputs to the controller 26. When the mode control switch 90 is in a second state, in which the second output lines 96 are interconnected with the pushbuttons 54, the pushbuttons 54 operate to generate control signals which are applied directly to the multi-axis drive communication unit 16, independently of the action of the controller 26.

In addition, the mode control switch 90 includes a controller enable switch 98 which moves in synchronization with the remaining switches of the mode control switch 90. This controller enable switch 98 is used to enable control of the press 12 by the controller 26 when the mode control switch 90 is in the first state shown in FIG. 8, and to disable control of the press 12 by the controller 26 when the mode control switch is switched to the second state. The controller enable switch 98 insures that the controller 26 is positively prevented from controlling the press 12 when the mode control switch 90 is in the second state.

The mode control switch 90 allows an operator to disable the controller 26 simply and quickly and to assume direct manual control over the press 12 if necessary. In effect, each of the pushbuttons 54 has two separate modes of operation. The first is a programming mode of operation in which the signals generated by the pushbuttons 54 are applied to the controllers 25,26; the second is a direct control mode of operation in which signals generated by the pushbuttons 54 directly control operation of the press 12. Since each of the pushbuttons 54 has two modes of operation, the front panel 50 is not unduly cluttered by an excessive number of switches.

Preferably, the mode control switch 90 is electromagnetically controlled by a manual device such as a key switch, and the individual switches are arranged such that they automatically revert to the manual control mode in the event of power failure to the switch 90. In some embodiments the pushbuttons 54 may be hard labeled by permanent labels on the panel 50 indicative of the functions of the pushbuttons 54 when in the manual control mode. Such permanent labels can be used by an operator after he has switched the mode control switch 94 to the second state in order to assume manual control over operation of the press 12.

Figure 9:
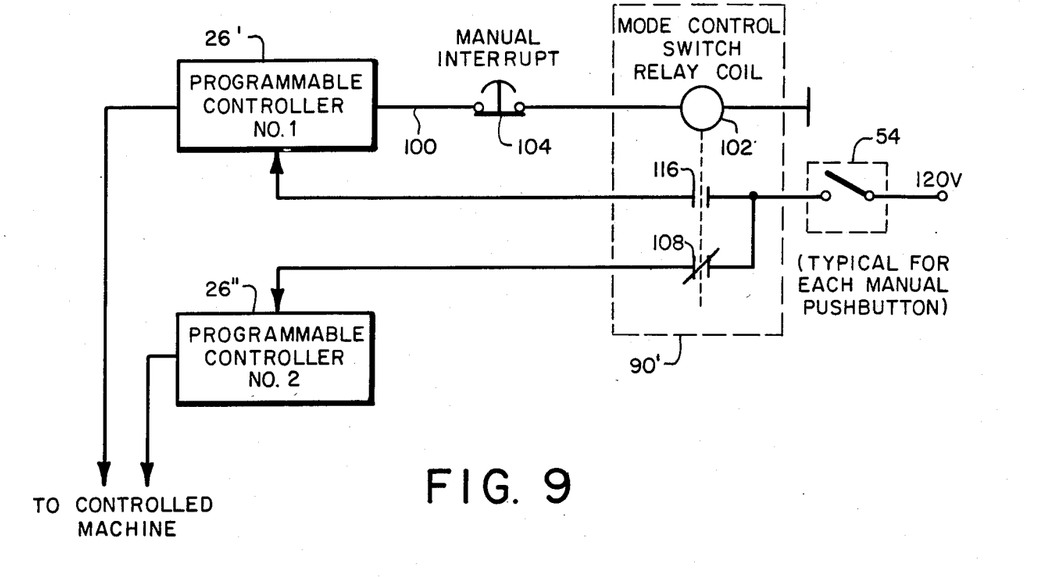
FIG. 9 is a block diagram of an alternate embodiment.

FIG. 9 shows an alternate arrangement in which a mode control switch 90' is used to direct control signals from the manual pushbuttons 54 to one of two programmable controllers. During normal operation, a first programmable controller 26' generates a voltage on a line 100 which supplies power to a relay coil 102 of the mode control switch 90'. A manual interrupt switch 104 is provided in the line 100 in order to allow an operator to remove power from the coil 102 at any time. Each of the manual pushbuttons 54 is connected to a respective input of the first controller 26' via a respective normally open switch 106 and to a respective input of a second controller 26" via a respective normally closed switch 108. Both of the controllers 26', and 26" are connected to control the controlled machine.

During normal operation, the first controller 26' powers the coil 102, the switch 106 is closed, and the switch 108 is open. Control signals from the manual pushbuttons are therefore routed to the first controller 26′. However, if either the first controller interrupts current to the coil 102 in response to a failure (such as a detected screen error as described above) or the operator opens the switch 104, then the switch 106 opens and the switch 108 closes. When this happens, control signals from the pushbuttons 54 are automatically routed to the second controller 26″. Of course, in applications where a redundant controller 26″ is not required, direct control or relay control over the controlled machine may be substituted for the second controller 26″.

Purely by way of example, the following details are provided better to define the best mode of this invention. In this embodiment, each of the pushbuttons 54 is a 120 VAC, oil-tight, square miniature pushbutton such as that marketed by the Square D Company as switch No. 9001 LS1L. The use of a 120 VAC switch provides important advantages in a machine control environment due to the large voltage transients commonly associated with the large switched currents needed to control a machine such as the press 12. In this embodiment, the front panel 50 is hinged to an oil-tight NEMA 12 modular cabinet with internal shock mounting that houses the CRT 52. In this embodiment the CRT 52 is a thirteen-inch color CRT such as Intercolor Model 2405 marketed by ISC of Atlanta. In this embodiment, the cabinet is mounted on cup mounts such as Part No. 52064 of Tech Products Corp., Dayton Ohio and the CRT 52 is mounted in the cabinet on vibration isolation mounts such as E-A-R Lab Mount L-020 supplied by Cabot Corporation, Indianapolis, Ind. A scratch resistant non-glare plastic is mounted on the inside surface of the front panel 50 to protect the glass face of the CRT 52. The rays 58 on the front panel 50 are colored white and yellow in alternation to correspond with the color of the associated pushbuttons 54 and the associated menu fields 62 in order to improve the visual alignment of each of the pushbuttons 54 with respect to the respective menu field 62.

From the foregoing, it should be apparent that an improved machine control system has been described which provides a positive check that the displayed image screen is in fact the desired image screen commanded by the controller. Furthermore, a simple and reliable system has been described for quickly disabling the machine control system and providing direct manual control of the controlled machine.

Of course, it should be understood that a wide range of changes and modifications can be made to the preferred embodiment described above. For example, selector switches, pilot lights, thumb wheels, key pads, and potentiometers can be substituted for the pushbuttons shown. In addition, the present invention can be adapted for use with the widest range of machine control systems for the widest variety of machines. Moreover, other types of screen codes can be used, and other photodetetors such as photo-transistors, photo-diodes, and the like can be used to sense the displayed screen image code. It is therefore intended that the foregoing detailed description being regarded as illustrative rather that limiting, and that it be understood that it is the following claims, including all equivalents, which are intended to define the scope of the invention.

I claim:

1. In a machine control system of the type comprising a controller, a display screen, and means for displaying any selected one of a plurality of separate screen images on the screen, the improvement comprising:
   means for providing a positive check that the screen and the displaying means are operating properly to display the selected one of the screen images, said check providing means comprising:
   means for generating a plurality of screen image codes, each comprising a plurality of code regions and each included in a respective one of the screen images such that the screen image and the respective screen image code are displayed together on the display screen;
   a plurality of sensors, each positioned to sense a respective one of the code regions and to generate a respective sensor signal indicative of the sensed code region; and
   means for comprising the sensor signals with the screen image code for a displayed one of the screen images and for indicating any disparity therebetween.

2. The invention of claim 1 wherein the selected ones of the screen images are determined by the controller, and wherein the comparing means is included in the controller.

3. The invention of claim 1 wherein each of the code regions represents a respective binary bit in the screen image code.

4. The invention of claim 1 wherein each of the screen image codes is arranged along a peripheral edge of the respective screen image.

5. The invention of claim 1 wherein the display screen is mounted behind a panel, and wherein each of the sensors is mounted to the panel along a peripheral edge of the display screen.

6. The invention of claim 1 wherein each of the sensors comprises a respective photosensor responsive to brightness of the respective code region.

7. In a machine control system of the type comprising a programmable controller, a display screen, and means for displaying any selected one of a plurality of separate screen images on the screen, the improvement comprising:
   means for providing a positive check that the screen and the displaying means are operating to display the selected screen image, said check providing means comprising:
   means for generating a plurality of screen image codes, each included in a respective one of the screen images such that both the screen image and the respective one of the codes are displayed on the display screen together;
   means for sensing the screen image codes and for generating a code signal in response thereto; and
   means for comparing the code signal with the screen image code for a displayed one of the screen images and for indicating any disparity therebetween to provide a positive check of the screen and the displaying means.

8. The invention of claim 7 further comprising means, responsive to the comparing means, for interrupting operation of the machine control system in the event of a disparity between the code signal and the screen image code for the displayed one of the screen images and the code signal.

9. In a machine control system of the type comprising a controller, a display screen, and means for displaying a plurality of separate screen images on the screen, at least some of said screen images comprising a set of switch labels, each switch label positioned in a respective label region of the screen image, the improvement comprising:

an array of switches mounted on the front panel in physical alignment with respective label regions of the screen images;

a mode control switch having a set of common poles, each connected with a respective one of said switches, a set of first output lines, and a set of second output lines, said mode control switch operative to interconnect each of the switches with a respective one of the first output lines when the mode control switch is in a first state, and to interconnect each of the switches with a respective one of the second output lines when the mode control switch is in a second state;

means for connecting the first output lines to the controller such that the switches provide respective input signals to the controller when the mode control switch is in the first state; and means, independent of the machine control system, for connecting the second output lines to a machine controlled by the control system such that the switches provide respective control signals for the machine independently of the controller when the mode control switch is in the second state, thereby bypassing the machine control system.

10. The invention of claim 9 further comprising means for disabling control of the machine by the control system when the mode control switch is in the second state.

11. The invention of claim 9 wherein the mode control switch is manually operable.

12. The invention of claim 11 wherein the mode control switch comprises a key switch.

13. The invention of claim 9 wherein each of the array of switches comprises a respective 120 VAC switch.

14. The invention of claim 9 wherein each of the array of switches comprises a respective pushbutton.

* * * * *

UNITED STATES PATENT AND TRADEMARK OFFICE
CERTIFICATE OF CORRECTION

PATENT NO. : 4,697,231
DATED : Sept. 29, 1987
INVENTOR(S) : Samuel G. Boytor et al.

It is certified that error appears in the above-identified patent and that said Letters Patent is hereby corrected as shown below:

IN THE DETAILED DESCRIPTION OF
THE PRESENTLY PREFERRED EMBODIMENTS

In column 3, line 48, please delete "corresponds" and substitute therefor --correspond--;

In column 3, line 51, please delete "suitation" and substitute therefor --situation--;

In column 7, line 25, please delete "Intercolor" and substitute therefor --Intecolor--;

In column 7, line 57, please delete "photodetetors" and substitute therefor --photodetectors--.

IN THE CLAIMS

In Claim 1 (column 8, line 15), please delete "comprising" and substitute therefor --comparing--.

Signed and Sealed this

Eighteenth Day of October, 1988

Attest:

DONALD J. QUIGG

Attesting Officer

Commissioner of Patents and Trademarks